United States Patent [19]

Kitamura et al.

[11] Patent Number: 5,283,840
[45] Date of Patent: Feb. 1, 1994

[54] METHOD AND APPARATUS FOR EXTRACTING IMAGE DATA

[75] Inventors: Hideaki Kitamura; Katsuya Yamaguchi, both of Kyoto, Japan

[73] Assignee: Dainippon Screen Mfg. Co., Ltd., Kyoto, Japan

[21] Appl. No.: 872,220

[22] Filed: Apr. 22, 1992

[30] Foreign Application Priority Data

Apr. 26, 1991 [JP] Japan ................................ 3-125438

[51] Int. Cl.$^5$ ............................................. G06K 9/46
[52] U.S. Cl. ...................................... 382/16; 382/56; 382/41; 358/453
[58] Field of Search .................. 382/16, 17, 56, 33, 382/41, 44; 358/453, 462, 464; G06K 9/46, 9/66, 9/64, 9/68, 9/36; H04N 1/40

[56] References Cited

U.S. PATENT DOCUMENTS 4,805,135  2/1989  Ochi et al. ............................ 358/453
4,837,635  6/1989  Santos .................................. 358/453
5,093,873  3/1992  Takahashi ............................. 382/16

FOREIGN PATENT DOCUMENTS 60-254280  12/1985  Japan .
62-188467   8/1987  Japan .
64-23377    1/1989  Japan .

*Primary Examiner*—Yon J. Couso
*Attorney, Agent, or Firm*—Lowe, Price, LeBlanc & Becker

[57] ABSTRACT

A method for extracting partial run-length data comprises the steps of: reading out total run-length data from a first memory in order of scanning; generating index data which indicates the relationship between the address of the first memory assigned to run-length data representing a first run of each scanning line and the subscanning coordinate of each scanning line; extracting partial run-length data representing the specified partial image out of the total run-length data from the first memory while referring to the index data corresponding to a range of the subscanning coordinate of the partial image; and executing image processing on the partial run-length data extracted.

15 Claims, 9 Drawing Sheets

METHOD AND APPARATUS FOR EXTRACTING IMAGE DATA

BACKGROUND OF THE INVENTION

1. Field of the Invention

The present invention relates to a method of and an apparatus for extracting image data representing a desired part of a whole image out of total image data representing the whole image.

2. Description of the Related Art

Image processors these days have a function to electronically perform various types of image processings. In some cases, only a part of an image (hereinafter referred to as partial image) is subjected to image processing such as image combining. Such partial image processing will be executed by the steps of: extracting partial image data representing the partial image out of total image data of the whole image, and performing the desired image processing on the partial image data.

When the total image data is of run-length data type, the partial image data is extracted from the total run-length data of the whole image as follows: FIG. 1 is a conceptive view illustrating an example of an image IM including a partial image PI to be extracted. The image IM is represented by run-length data, whose structure is shown in FIG. 2. The image IM of FIG. 1 is represented by run-length length data Dr1, Dr2, . . . , and Dri, as shown in FIG. 2, of respective scanning lines L1, L2, . . . , and Li in a main scanning direction Y.

As shown in FIG. 2, run-length data on a certain scanning line usually consists of plural units of run-length data. For example, first run-length data Dr1 includes three run-length data units Dr1(1), Dr1(2), and Dr1(3). These plural run-length data units Dr1(1), Dr1(2), and Dr1(3) respectively represent run lengths of the different colors of an image fragment on the scanning line L1, for example, white/black/white. In this specification, "black" and "white" are dealt with as different colors.

Extraction of run-length data representing the partial image PI shown in FIG. 1 will be performed by the steps of: successively reading out run-length data units from the first unit Dr1(1) to retrieve a particular data unit representing a first pixel Pi of the partial image PI; and extracting run-length data units covering the first pixel Pi to a last pixel Pe of the partial image PI.

The conventional image processing system, which reads out run-length data in sequences from the beginning of the total run-length image data, consumes rather a long time to find the run-length data representing the partial image. Any image processing on the partial image therefore requires the preceding data retrieval, which increases the total processing time undesirably.

SUMMARY OF THE INVENTION

An object of the present invention is to accelerate the extraction of run-length image data representing a desired partial image out of the total image data.

The present invention is directed to a method of extracting partial image data representing a desired part of a whole image from total image data representing the whole image, comprising the steps of: (a) preparing a first memory and a second memory; (b) preparing total run-length data representing the whole image in order of scanning, and storing the total run-length data in the first memory; (c) reading out the total run-length data from the first memory in order of scanning, generating index data for each scanning line in the whole image indicative of relationship between a subscanning coordinate of each scanning line and a first address of the first memory where run-length data representing a first run on each scanning line is stored, and storing the index data in the second memory; (d) specifying an area of a partial image to be extracted; (e) determining a first range of main scanning coordinate and a second range of subscanning coordinate each range covering the partial image; and (f) extracting partial run-length data representing the partial image out of the total run-length data from the first memory on the basis of the first and second range of coordinate while referring to the index data corresponding to the second range of subscanning coordinate.

Preferably, the step (f) comprises the steps of: (f-1) reading out the first address included in the index data for each scanning line in the second range of subscanning coordinate; (f-2) supplying the first address obtained at step (f-1) to the first memory to thereby read out run-length data representing scanning lines in the second range of subscanning coordinate; and (f-3) extracting the partial run-length data which represents an image area in the first range of main scanning coordinate.

According to an embodiment of the present invention, each subscanning coordinate of the whole image is arithmetically related to the second address of the second memory; and the step (f-1) comprises the step of determining the second address of the second memory corresponding to each subscanning coordinate in the second range, and supplying the second address thus obtained to the second memory to read out the first address included in the index data for each scanning line in the second range of subscanning coordinate.

The method in the embodiment further comprises the step of: (g) performing predetermined image processing on the partial run-length data representing the partial image.

The present invention is also directed to an apparatus for extracting partial image data representing a desired part of a whole image from total image data representing the whole image, comprising: a first memory for storing total run-length data representing the whole image; a second memory; means for reading out the total run-length data from the first memory in order of scanning, generating index data for each scanning line in the whole image indicative of relationship between a subscanning coordinate of each scanning line and a first address of the first memory where run-length data representing a first run on each scanning line is stored, and storing the index data in the second memory; means for specifying an area of a partial image to be extracted; range determining means for determining a first range of main scanning coordinate and a second range of subscanning coordinate each range covering the partial image; and extraction means for extracting partial run-length data representing the partial image out of the total run-length data from the first memory on the basis of the first and second range of coordinate while referring to the index data corresponding to the second range of subscanning coordinate.

According to an aspect of the present invention, an apparatus for extracting partial run-length data representing a desired part of a whole image from total run-length data representing the whole image, comprises: a first RAM (Random Access Memory) for storing the total run-length data; a second RAM; a display for displaying the whole image on the basis of the total run-length data; input means for specifying an area of a partial image to be extracted on the whole image displayed on the display; and a processor for reading out the total run-length data from the first RAM in order of scanning; generating index data for each scanning line in the whole image indicative of relationship between a subscanning coordinate of each scanning line and a first address of the first RAM where run-length data representing a first run on each scanning line is stored; storing the index data in the second RAM; determining a first range of main scanning coordinate and a second range of subscanning coordinate each range covering the partial image; and extracting partial run-length data representing the partial image out of the total run-length data from the first RAM on the basis of the first and second range of coordinate while referring to the index data corresponding to the second range of subscanning coordinate.

These and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 3:
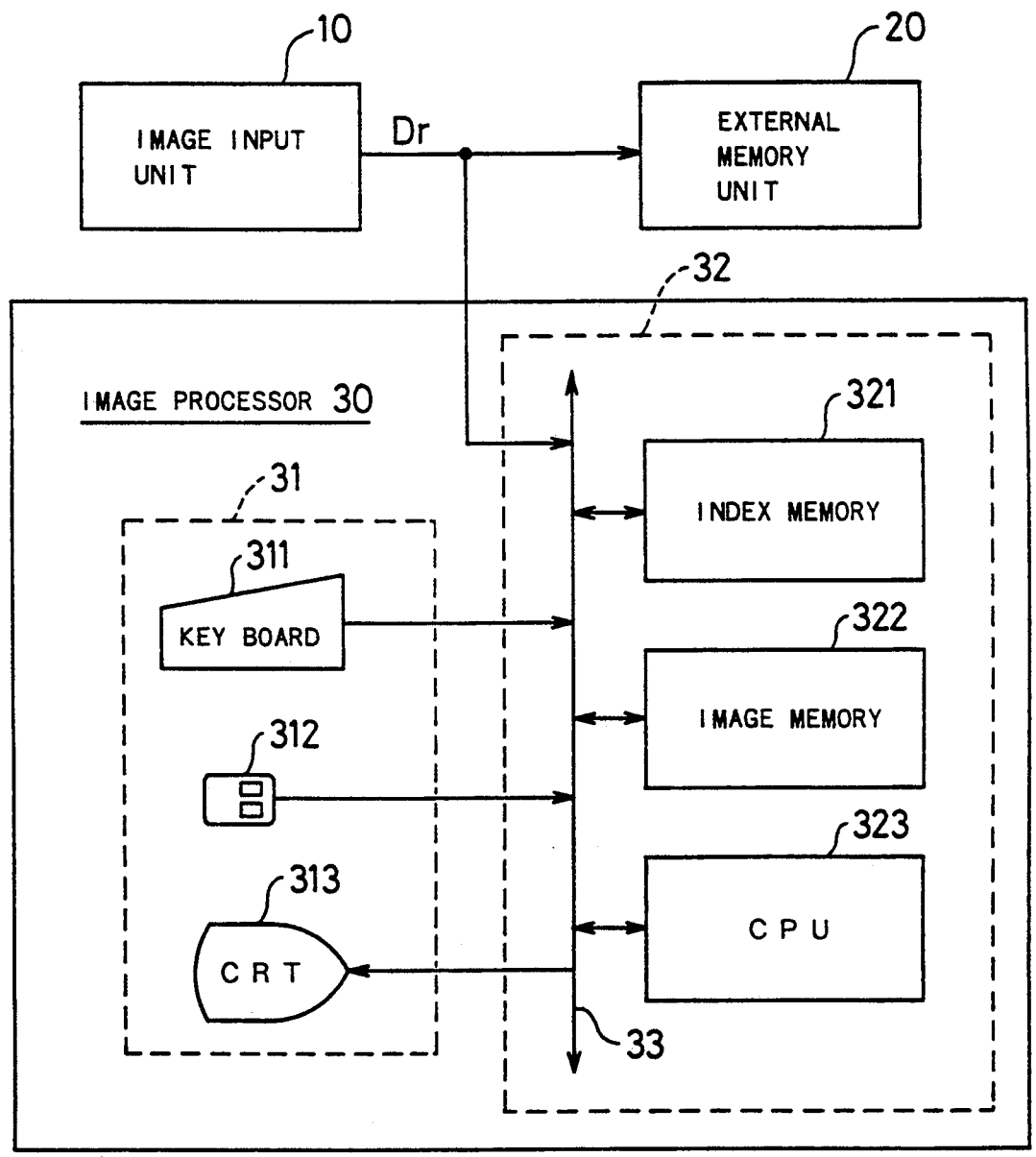
FIG. 3 is a block diagram showing the structure of an image processing system embodying the present invention.

FIG. 3 is a block diagram showing the structure of an image processing system embodying the present invention. The image processing system includes an image input unit 10 such as a scanner, an external memory unit 20 such as a hard disk, and an image processor 30.

The image processor 30 comprises: an instruction input unit 31 including a keyboard 311, a mouse 312, and a CRT display 313; and an image processing unit 32 including an index memory 321, an image memory 322, and a CPU (Central Processing Unit) 323, as well as RAM and ROM (not shown) in which software programs for executing various image processings described below are stored. The index memory 321 and the image memory 322 are random access memories. The instruction input unit 31, the memories 321 and 322, and the CPU 323 are connected to one another via a bus line 33.

Figure 4:
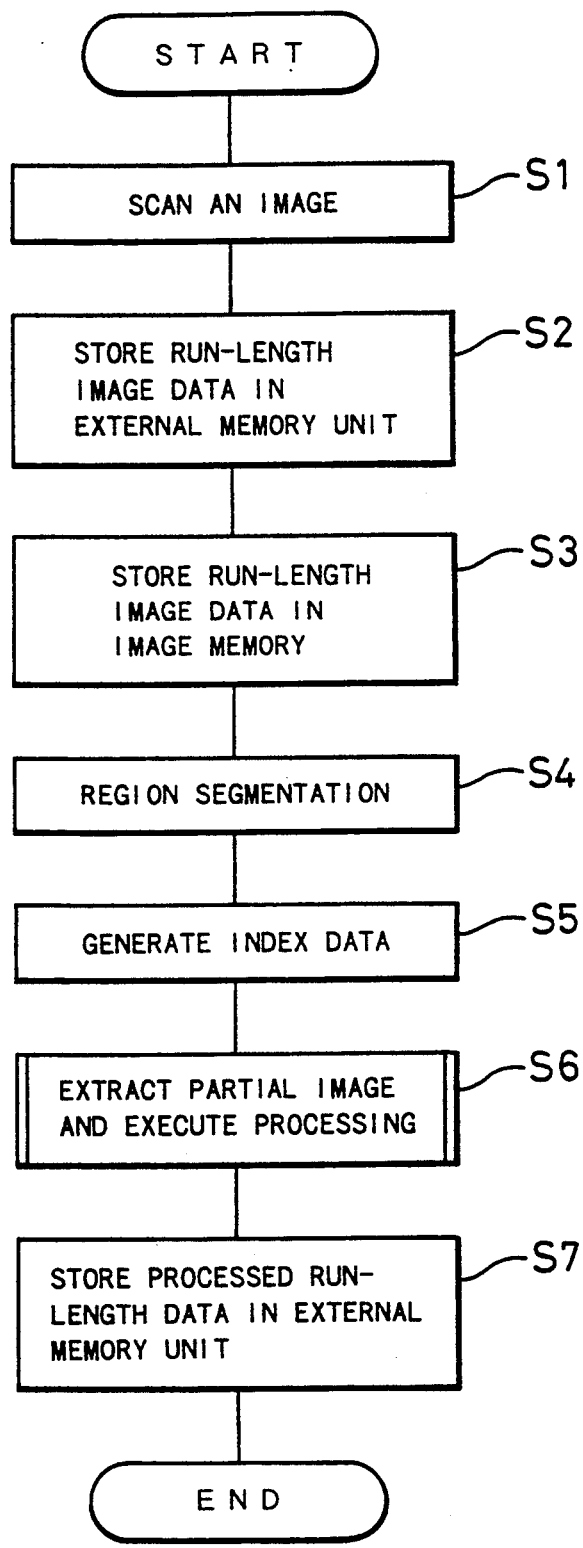
FIG. 4 is a flowchart showing the procedure of image processing executed by the image processing system of the embodiment.

FIG. 4 is a flow chart showing the procedure of image processing executed by the image processing system of the embodiment.

Figure 2:
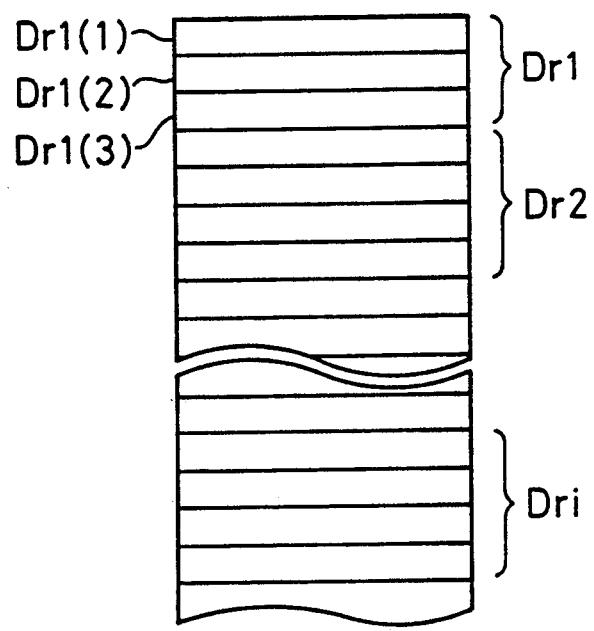
FIG. 2 is a conceptive view showing the structure of run-length data.
Figure 5:
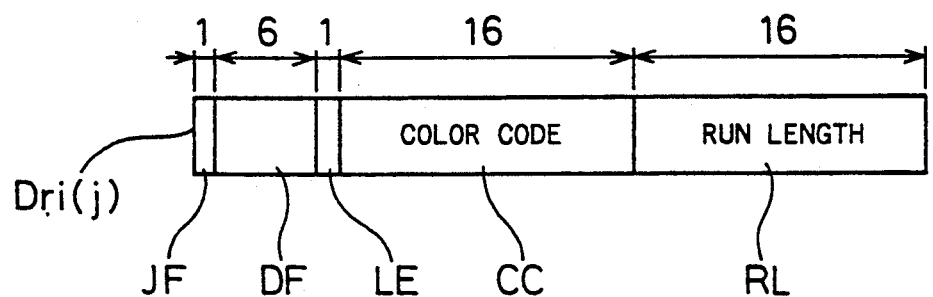
FIG. 5 is a conceptive view showing the structure of a run-length data unit.

At step S1, run-length data Dr of an original image is produced by photoelectrically scanning the original image through the image input unit 10. The run-length data Dr includes run-length data units arranged in order of scanning as shown in FIG. 2. FIG. 5 is a conceptive view illustrating typical structure of a run-length data unit Dri(j), which consists of the following five data elements:

(1) Jump flag JF: The flag value is '0' when the next run-length data unit exists in the subsequent address in the image memory 322. On the contrary, the flag value is '1' when the next run-length data unit exists in an address other than the subsequent address. The latter case will later be described in detail.

(2) Preliminary data DF: This element shows preliminary data.

(3) Last data flag LE: The flag indicates that the data unit is the last run-length data unit on a scanning line.

(4) Color code data CC: This element denotes the color of an image fragment expressed by the run-length data unit. When the original image is a black and white image drawn as linework, the color code data CC shows either white or black at the stage of step S1.

(5) Run length RL: This element indicates a run length of the run-length data unit.

At step S2, the run-length data Dr produced at step S1 is supplied from the image input unit 10 to the external memory unit 20 to be stored therein. The external memory unit 20 generally stores plural sets of run-length data Dr for plural sets of images.

At the following step S3, the run-length data Dr of the image to be processed is supplied from the external memory unit 20 to the image processor 30 and stored in the image memory 322 of the processor 30. Alternatively, the run-length data Dr produced by the image input unit 10 can directly be stored in the image memory 322 instead of going through step S2.

Figure 1:
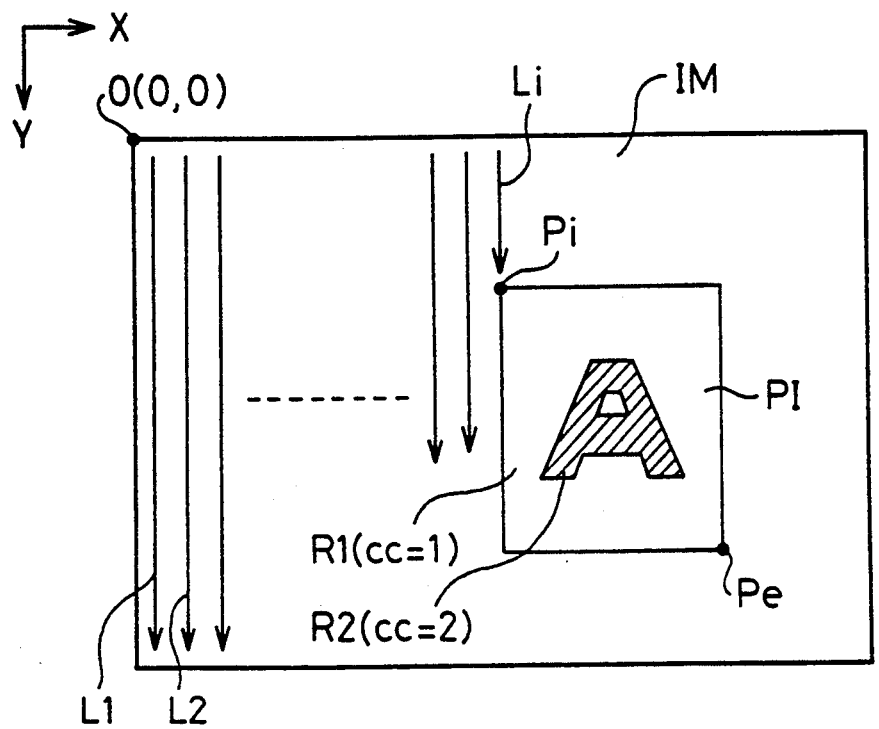
FIG. 1 is an explanatory view showing an image.

The program then proceeds to step S4 at which the CPU 323 executes region segmentation of the image-to-be-processed based on the run-length data Dr. In the region segmentation, a color code CC is allocated to each independent image area in the original image; for example, a black image area is allocated with a color code different from that of white background. In the partial image PI of FIG. 1, a color code data CC=1 is assigned to a background area R1 and CC=2 to an area R2 of the letter 'A'. Since the identical color code data CC is allocated to all pixels in the same independent image area, plural independent image areas can be distinguished from each other by referring to the color code data CC. Here the color code data CC does not generally represent actual color of the image but it denotes a provisional color allocated to each independent image area for identification.

Details of region segmentation is disclosed in the commonly owned copending U.S. application Ser. No. 07/788,211 filed on Nov. 5, 1991 now U.S. Pat. No. 5,251,022, which is incorporated herein by referenced.

At step S5, the CPU 323 generates index data on the basis of the run-length data Dr and stores the index data in the index memory 321. The index data is produced for each of those run-length data unit which represent the first run, black or white, of main scanning lines, and it shows the interrelation between the address of the run-length data unit in the image memory 322 and the position of the scanning line in a subscanning direction X.

Figure 6:
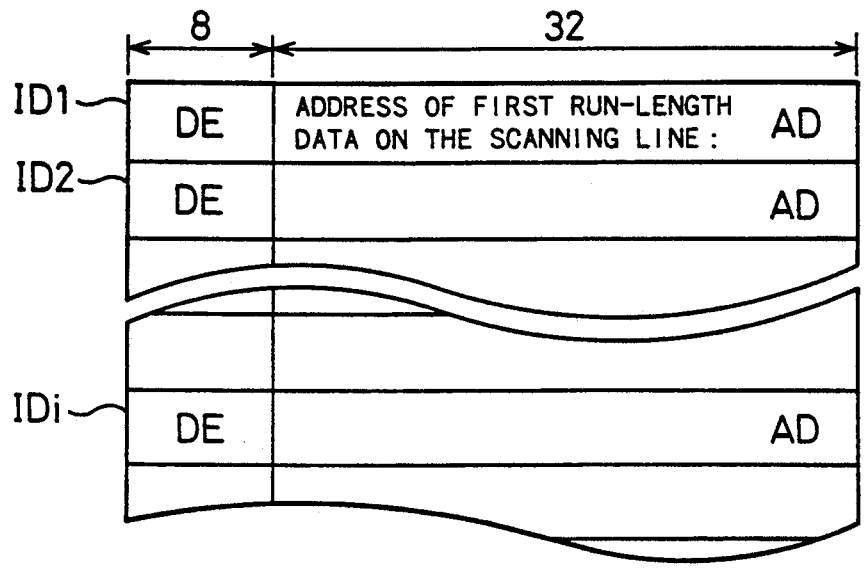
FIG. 6 is a conceptive view showing the structure of index data.
Figure 7:
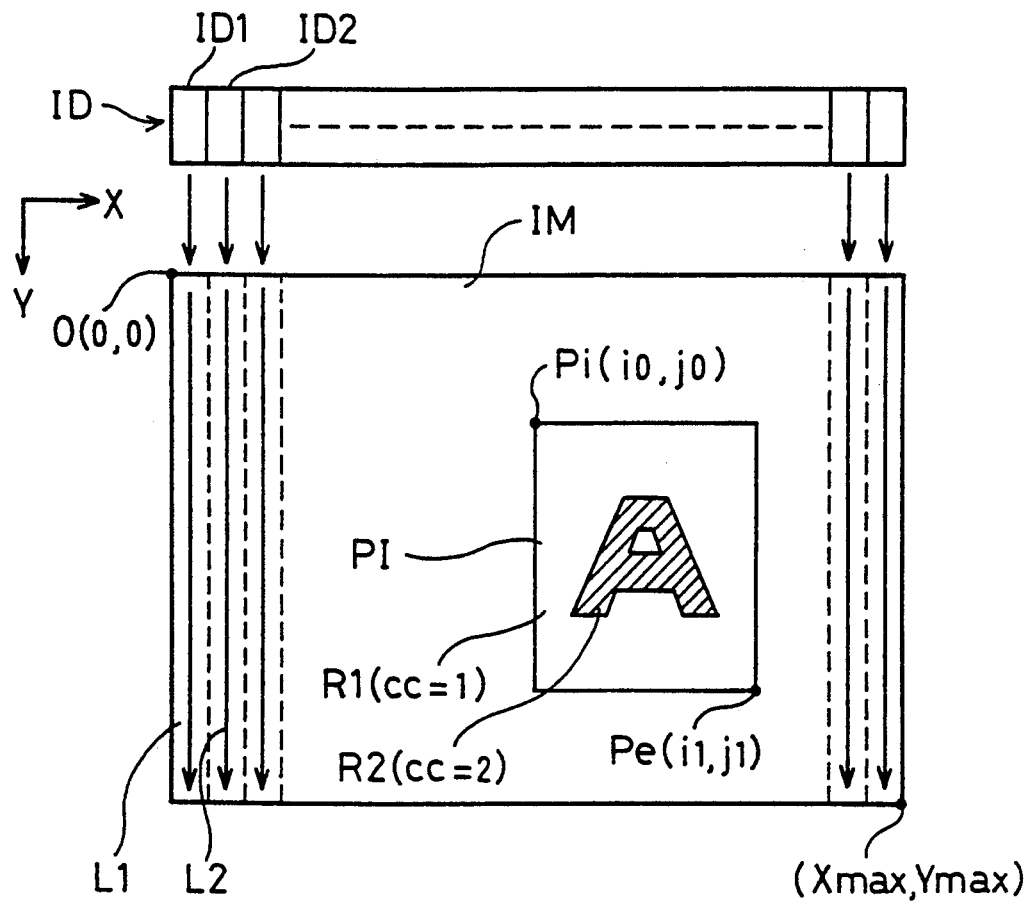
FIG. 7 is an explanatory view illustrating the relationship between the image and the index data.

FIG. 6 is a conceptive view illustrating a typical structure of the index data ID, and FIG. 7 is a conceptive view showing the relationship between the index data ID and the scanning line. Each index data IDi (ID1, ID2, ...) corresponding to a respective scanning line Li (LI, L2, ...) consists of an address data element AD and a preliminary data element DE. The address data element AD indicates an address in the image memory 322 in which the run-length data unit representing the first run of an image fragment on each scanning line is stored. The preliminary data element DE indicates, for example, the number of run-length data units included in the scanning line. The address of the index memory 321 corresponds to a subscanning coordinate i of the index data IDi. Accordingly, index data IDi for a subscanning coordinate i is read out from the index memory 321 by supplying the address i which is identical with the subscanning coordinate i.

Figure 8:
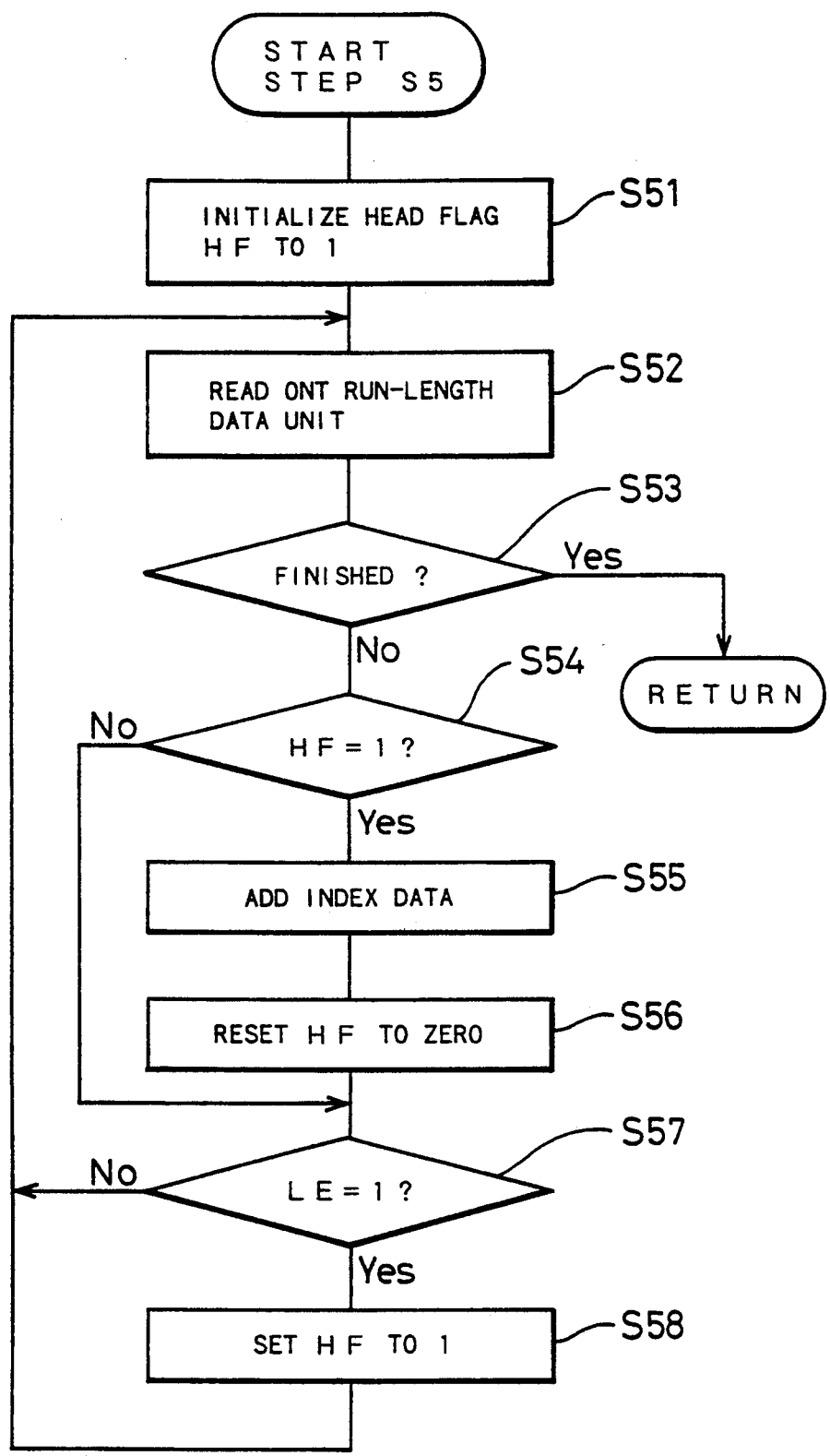
FIG. 8 is a flowchart showing details of step S5 of FIG. 4.

FIG. 8 is a flowchart showing details of step S5 of FIG. 4.

At step S51, a head flag HF is initialized to one. The head flag HF is used only in generation of index data; the flag value '1' is allocated to a run-length data unit at the head of each scanning line, and the flag value '0' to the other run-length data units. Since the first run-length data unit represents the first run of the first scanning line, the head flag HF is set at '1' at step S51.

At the following step S52, the CPU 323 reads one run-length data unit from the image memory 322. When no run-length data unit is, however, read out from the image memory 322 at step S52, that is, when no unprocessed run-length data unit exists in the image memory 322, the program proceeds from step S53 to return to the flowchart of FIG. 4 and proceeds to step S6.

Otherwise, the program proceeds to step S54 at which the CPU 323 checks the value of the head flag HF. When the flag HF is equal to one, index data IDi corresponding to a scanning line Li is generated and added to a series of index data ID at step S55 as shown in FIG. 6. In the first routine, index data ID1 corresponding to the coordinate i=1 is generated for the first run-length data unit. At the following step S56, the head flag HF is reset to zero.

When the head flag HF is equal to zero at step S54, on the other hand, the program skips steps S55 and S56 and proceeds to step S57.

At step S57, the CPU 323 checks the value of the last data flag LE of the run-length data unit. When the last data flag LE is equal to one, which means that the run-length data unit is the last data on the scanning line, the program proceeds to step S58, at which the head flag HF is set to one. Since the value '1' of the flag LE indicates the end of the run-length data units on the scanning line Li, the CPU 323 turns the flag HF to one to prepare for generation of the next index data for the next scanning line at step S58.

When the last data flag LE is equal to zero at step S57, the program skips step S58 and returns to step S52.

The CPU 323 repeats steps S52 through S58 as described above and generates the index data ID shown in FIG. 6, which is stored in the index memory 321.

Figure 9:
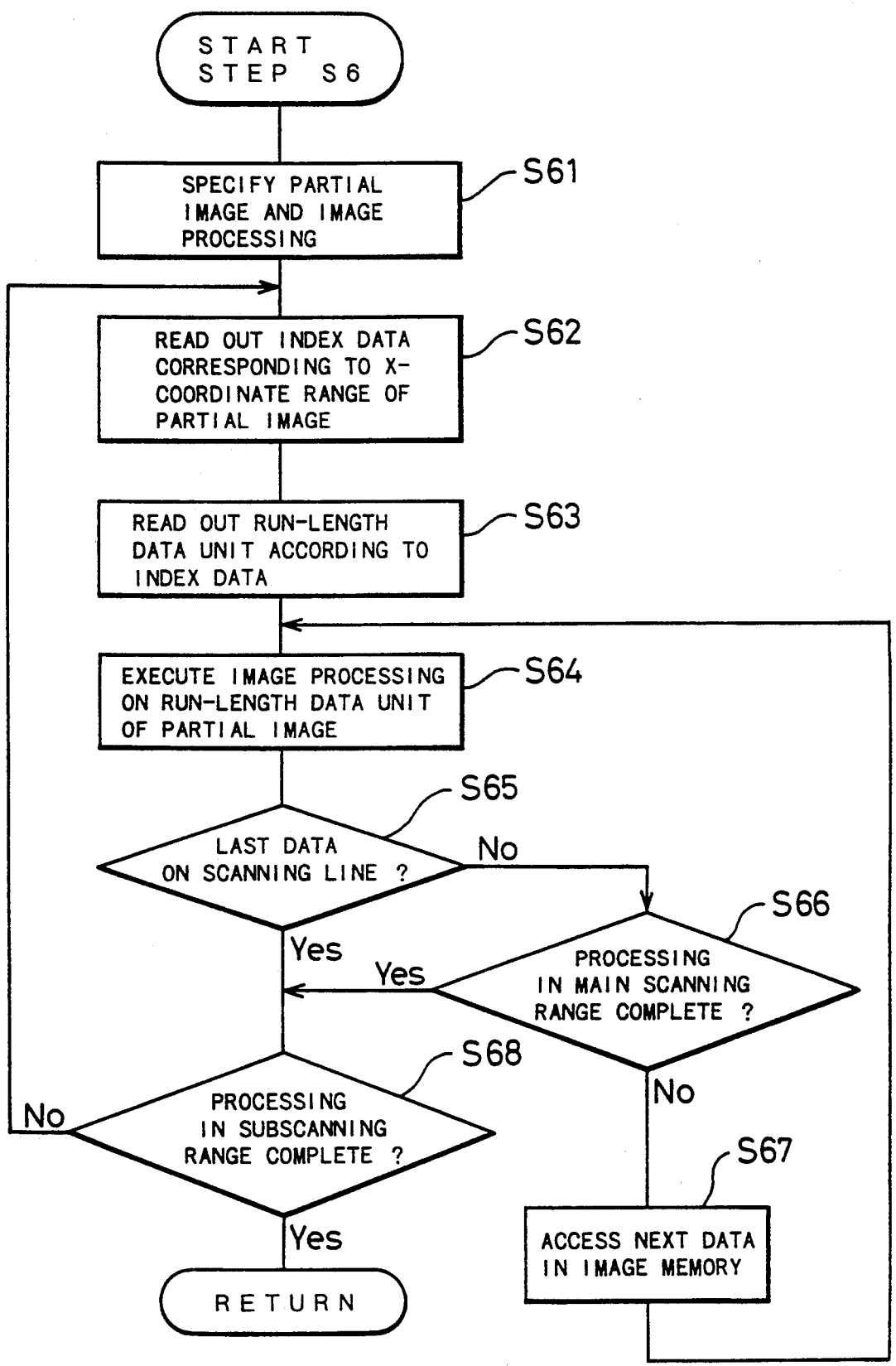
FIG. 9 is a flowchart showing details of step S6 of FIG. 4.

After generating the index data ID at step S5 of FIG. 4, the program proceeds to step S6 for image processing. FIG. 9 is a flowchart showing details of the image processing at step S6.

At step S61, an operator specifies the region of the partial image PI to be extracted (see FIG. 5) with the mouse 312 on the image IM displayed on the CRT display 313. The operator further inputs content of image processing with the keyboard 311 or the mouse 312. The region of the partial image PI is defined, for example, by clicking the mouse 312 at the positions of the coordinates (i0, j0) of the left-uppermost point Pi of the partial image PI and the coordinates (il, j1) of the right-undermost point Pe. The left-uppermost point Pi is the first pixel of the partial image PI in order of scanning, and the right-undermost point Pe is the last pixel of the partial image PI.

If the region of the partial image PI is specified by data other than the coordinates of the first pixel Pi and the last pixel Pe, the CPU 323 finds the coordinates i0 and i1 in the subscanning direction X of the first and last pixels Pi and Pe and executes the processing described below according to the coordinate values i0 and i1.

Image processing to be executed by the image processor here includes: combining of the partial image PI with another image; coloring of the partial image PI with a predetermined color; and expanding and contracting of the partial image PI.

At step S62, the CPU 323 successively reads out index data corresponding to the subscanning coordinate ranging from i0 to i1, between which the partial image PI exists. At the subscanning coordinate i0 for the first pixel Pi, for example, the CPU 323 accesses to the index memory 321 with an address equal to the subscanning coordinate i0, and thereby reads out the index data IDi from the index memory 321.

At the following step S63, the CPU 323 accesses to the image memory 322 with the address written in the address data element AD of the index data IDi read out at step S62, and thereby reads out a run-length data unit stored in the image memory 322.

At step S64, the CPU 323 executes the image processing specified at step S61 (for example, the image combining with another image) on the run-length data unit representing part of the partial image PI. Whether each run-length data unit represents part of the partial image PI or not is judged by comparing the range of the main scanning coordinate covered by each run-length data unit with the range of the main scanning coordinate from j0 to j1 for the partial image PI.

The program then proceeds to step S65 at which it is judged whether the run-length data unit is the last data on the current scanning line, or at the current subscanning coordinate. When the answer at step S65 is positive, the program proceeds to step S68, while the negative answer makes the program go to step S66.

At step S66, it is judged whether the image processing at the current subscanning coordinate, for example, i0, is completed for the range of the main scanning coordinate Y of the partial image PI. This judgement is made by comparing the range of the main scanning direction Y covered by the run-length data unit read out at step S63 with the main scanning coordinate j1 of the last pixel Pe of the partial image PI. When the answer is negative at step S66, the program proceeds to step S67 at which the CPU 323 reads out a next run-length data unit from the image memory 322, and returns to step S64. When the answer is positive at step S66, on the other hand, the program goes to step S68.

Step S68 is executed either when the current run-length data unit is judged to be the last data on the current main scanning line at step S65 or when the image processing at the current main scanning line is completed for the range of the main scanning coordinate of the partial image PI at step S66.

At step S68, it is determined whether the image processing is completed for the range of the subscanning coordinate X of the partial image PI. When the answer is negative, the program returns to step S62, and the processing of steps S62 through S67 is repeated for run-length data units on the next scanning line.

When the image processing specified at step S61 is completed for all the data of the partial image PI, the program goes to step S7 of FIG. 4 at which the CPU 323 stores the run-length data units obtained through the image processing in the external memory unit 20.

As described above, the image processing system of the embodiment generates index data ID, and reads out run-length data representing part of the partial image based on the index data ID for the subsequent image processing. The image processing system attains high-speed extraction of desired run-length data representing the partial image accordingly.

Figure 10:
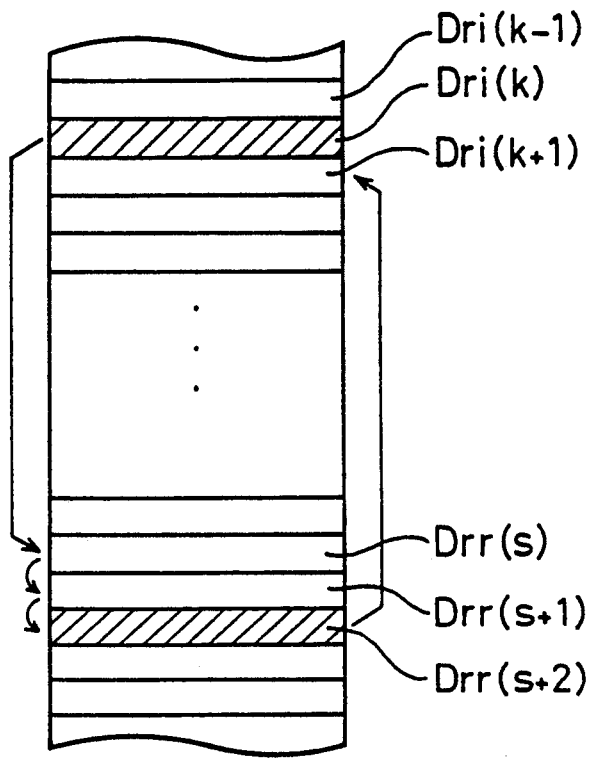
FIG. 10 is a conceptive view showing the structure of run-length data including jump data.

The run-length data units are arranged in order of scanning as shown in FIG. 2, but they can be arranged in another way. FIG. 10 is a conceptive view showing another arrangement, in which some run-length data units representing adjacent fragments in an image are stored in addresses apart from each other. A run-length data unit Dri(k) shown in FIG. 10 is of jump data type shown in FIG. 11. The jump data Dri(K) includes: a jump flag JF which is the most significant bit (MSB) and is '1' when the run-length data unit Dri(k) is of jump data type; and address data which are the last 32 bits and which indicates a jump address where the next run-length data unit Drr(s) is stored.

Figure 11:
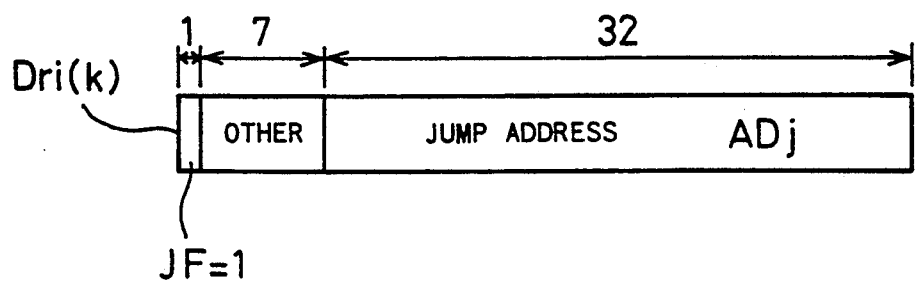
FIG. 11 is a conceptive view showing the structure of the jump data.

In the example illustrated in FIGS. 10 and 11, the CPU 323 reads out the run-length data unit Dri(k−1) and then the run-length data unit Drr(s) stored in the address specified by the jump data Dri(k). Another run-length data unit Drr(s+2) stored in the next address but one from the run-length data unit Drr(s) is also jump data which directs jumping to another run-length data unit Dri(k+1).

Even when the run-length data units are arranged not in order of scanning lines but in the jumping order, the address data element AD of the index data ID shown in FIG. 4 shows the address of the run-length data unit at the leading end of each scanning line. For example, when the run-length data unit Drr(s) of FIG. 10 corresponds to the leading end of the scanning line or X-coordinate r, the address data element AD of the index data IDr shows the address of the run-length data unit Drr(s) in the image memory 322.

The invention is not restricted to the above embodiment, but there may be various modifications and changes without departing from the spirit of the invention. Some examples of the modification are given below.

(1) According to the procedure of FIG. 9, image processing such as image combining is executed at step S64 upon reading out each run-length data unit. Alternatively, the image processing can be performed for bit map image data on plural scanning lines which is developed from run-length data units. When image expansion or contraction is performed with a mask of M×N pixels (M and N are integrals, for example, M=N=3), bit map image data on N main scanning lines is developed on a certain image frame memory in advance from the run-length data units.

(2) Although run-length data is divided into sets of run-length data units corresponding to respective scanning lines in the above embodiment, another type of run-length data representing an image fragment covering plural scanning lines can be used instead. An example of such run-length data is described below.

Figure 12A:
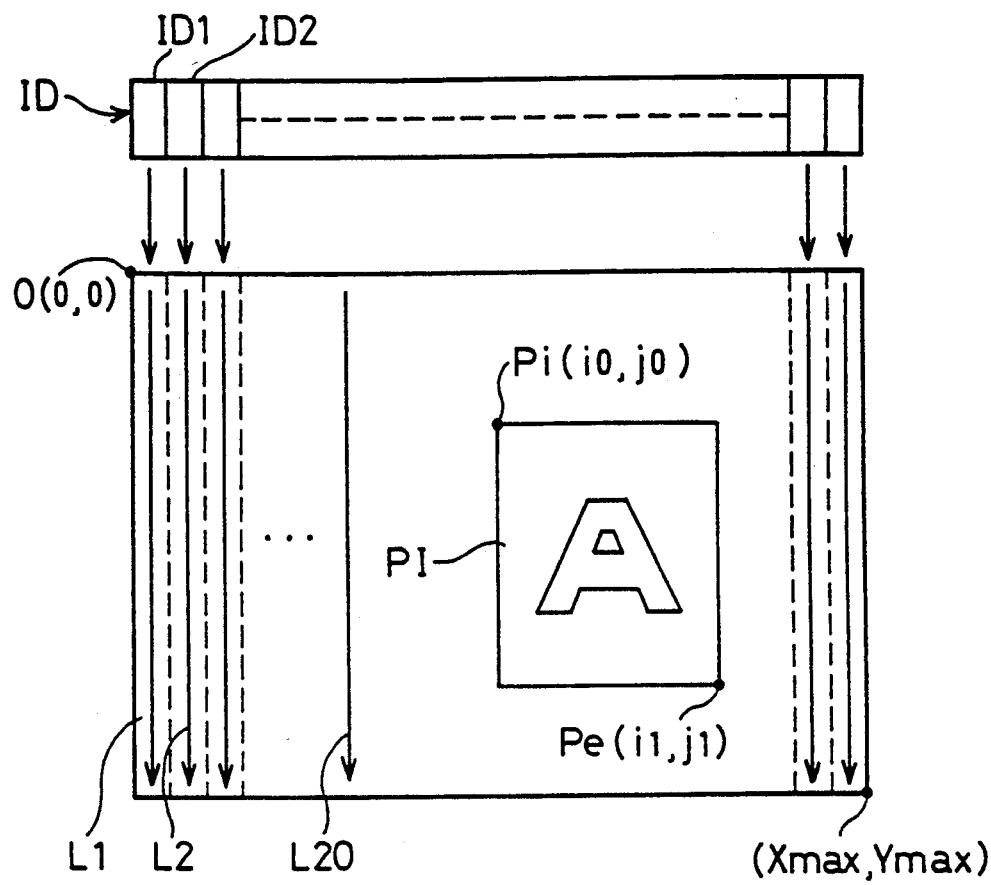
FIGS. 12 (a) through 12(c) are explanatory views illustrating modification of the run-length data and the index data.
Figure 12B:
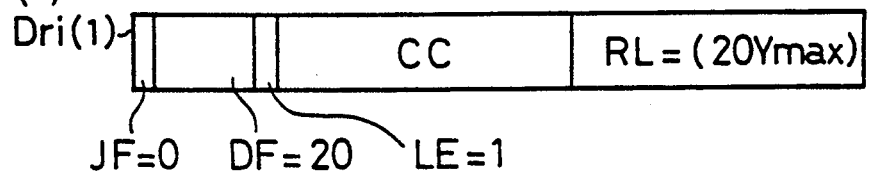

FIGS. 12 (a) through 12(c) are explanatory views showing another type of run-length data and index data. Suppose that the first twenty scanning lines L1 through L20 are all white in FIG. 12(a), the run length RL of the first run-length data unit Dr1(1) shown in FIG. 12(b) has the value twenty times as long as the maximum value Ymax in the main scanning coordinate Y. The preliminary data element DF indicates the number of scanning lines represented by the run-length data unit Dr1(1).

Figure 12C:
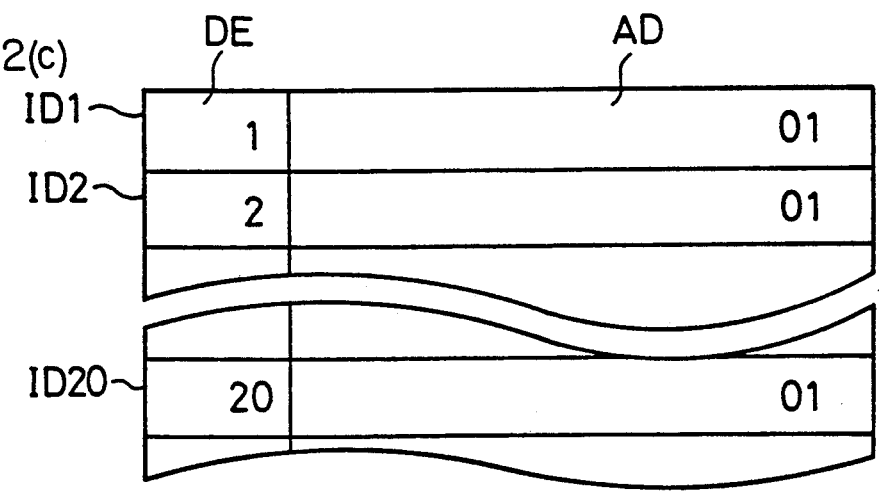

FIG. 12(c) shows the structure of the index data ID in this type of run-length data. The address (=01) of the first run-length data unit Dr1(1) is given to all the address data elements AD of the index data ID1 through ID20 corresponding to the scanning lines L1 through L20. The preliminary data element DE indicates the position of the corresponding scanning line among the twenty scanning lines represented by the run-length data unit Dr1(1).

Even if some run-length data units represent an image on plural scanning lines as described above, run-length data for a required scanning line can be read out according to the index data which is prepared for each scanning line, or each subscanning coordinate, and which indicates the corresponding run-length data unit. This application also allows high-speed extraction of run-length data representing a specific partial image.

(3) In the above embodiment, image processing is executed on all the run-length data units representing the partial image PI of FIG. 7. Only run-length data units representing a predetermined area in the partial image PI can be selected as the image subject to processing. The color codes CC=1 and =2 are respectively allocated to the image areas R1 and R2 in the partial image PI as shown in FIG. 7 through region segmentation at step S4 of FIG. 4. In this case, image processing like coloring with a specified color can be selectively executed only on the area R2 but not on the area R1 at step S64 of FIG. 9 by extracting the run-length data units which include a predetermined color code data CC, for example, CC=2. The area subject to image processing can be specified, for example, at step S61 of FIG. 9.

Although the above embodiment is implemented by the CPU 323 and software therefor, the image processing system can be also constructed with dedicated hardware circuitry for executing the data processing described above.

According to the present invention described above, index data is prepared for each scanning line, indicating an address of the run-length data unit representing the front run of each scanning line, or each subscanning coordinate. Desired part of run-length data representing a desired partial image can be therefore read out from the image memory by finding a range of subscanning coordinate of the partial image and referring to the address included in the index data corresponding to the range of the subscanning coordinate. This increases the processing speed in extracting the required run-length data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of extracting partial image data representing a desired part of a whole image from total image data representing said whole image, comprising the steps of:
   (a) preparing total run-length data representing said whole image in order of scanning, and storing said total run-length data in a first memory;
   (b) reading out said total run-length data from said first memory in order of scanning, generating index data for each scanning line in said whole image indicative of relationship between a subscanning coordinate of each scanning line and a first address of said first memory where run-length data representing a first run on each scanning line is stored, and storing said index data in a second memory;
   (c) specifying an area of a partial image to be extracted;
   (d) determining a first range of main scanning coordinate and a second range of subscanning coordinate each range covering said partial image; and
   (e) extracting partial run-length data representing said partial image out of said total run-length data from said first memory on the basis of said first and second range of coordinate while referring to said index data corresponding to said second range of subscanning coordinate.

2. A method in accordance with claim 1, wherein: said step (e) comprises the steps of:
   (e-1) reading out the first address included in said index data for each scanning line in said second range of subscanning coordinate;
   (e-2) supplying the first address obtained at step (e-1) to said first memory to thereby read out run-length data representing scanning lines in said second range of subscanning coordinate; and
   (e-3) extracting said partial run-length data which represents an image area in said first range of main scanning coordinate.

3. A method in accordance with claim 2, wherein: each subscanning coordinate of said whole image is arithmetically related to said second address of said second memory; and
   said step (e-1) comprises the step of determining the second address of said second memory corresponding to each subscanning coordinate in said second range, and supplying the second address thus obtained to said second memory to read out the first address included in said index data for each scanning line in said second range of subscanning coordinate.

4. A method in accordance with claim 3, further comprising the step of:
   (f) performing predetermined image processing on said partial run-length data representing said partial image.

5. An apparatus for extracting partial image data representing a desired part of a whole image from total image data representing said whole image, comprising:
   a first memory for storing total run-length data representing said whole image;
   a second memory;
   means for reading out said total run-length data from said first memory in order of scanning, generating index data for each scanning line in said whole image indicative of relationship between a subscanning coordinate of each scanning line and a first address of said first memory where run-length data representing a first run on each scanning line is stored, and storing said index data in said second memory;
   means for specifying an area of a partial image to be extracted;
   range determining means for determining a first range of main scanning coordinate and a second range of subscanning coordinate each range covering said partial image; and
   extraction means for extracting partial run-length data representing said partial image out of said total run-length data from said first memory on the basis of said first and second range of coordinate while referring to said index data corresponding to said second range of subscanning coordinate.

6. An apparatus in accordance with claim 5, wherein: said extraction means comprises:
   first means for reading out the first address included in said index data for each scanning line in said second range of subscanning coordinate;
   second means for supplying the first address obtained by said first means to said first memory to thereby read out run-length data representing scanning lies in said second range of subscanning coordinate; and
   third means for extracting said partial run-length data which represents an image area in said first range of main scanning coordinate.

7. An apparatus in accordance with claim 6, wherein: each subscanning coordinate of said whole image is arithmetically related to said second address of said second memory; and
   said first means comprises means for determining the second address of said second memory corresponding to each subscanning coordinate in said second range, and supplying the second address thus obtained to said second memory to read out the first address included in said index data for each scanning line in said second range of subscanning coordinate.

8. An apparatus in accordance with claim 7, further comprising:
   means for performing predetermined image processing on said partial run-length data representing said partial image.

9. An apparatus for extracting partial run-length data representing a desired part of a whole image from total run-length data representing said whole image, comprising:
   a first RAM (Random Access Memory) for storing said total run-length data;
   a second RAM;
   a display for displaying said whole image on the basis of said total run-length data;
   input means for specifying an area of a partial image to be extracted on said whole image displayed on said display; and
   a processor for reading out said total run-length data from said first RAM in order of scanning; generating index data for each scanning line in said whole image indicative of relationship between a subscanning coordinate of each scanning line and a first address of said first RAM where run-length data representing a first run on each scanning line is stored; storing said index data in said second RAM; determining a first range of main scanning coordinate and a second range of subscanning coordinate each range covering said partial image; and extracting partial run-length data representing said partial image out of said total run-length data from said first RAM on the basis of said first and second range of coordinate while referring to said index data corresponding to said second range of subscanning coordinate.

10. An apparatus in accordance with claim 9, wherein:
said processor further executes the operation of:
reading out the first address included in said index data for each scanning line in said second range of subscanning coordinate;
supplying the first address thus obtained to said first RAM to thereby read out run-length data representing scanning lines in said second range of subscanning coordinate; and
extracting said partial run-length data which represents an image area in said first range of main scanning coordinate.

11. An apparatus in accordance with claim 10, wherein:
each subscanning coordinate of said whole image is arithmetically related to said second address of said second RAM; and
said processor further executes the operation of determining the second address of said second RAM corresponding to each subscanning coordinate in said second range, and supplying the second address thus obtained to said second RAM to read out the first address included in said index data for each scanning line in said second range of subscanning coordinate.

12. An apparatus in accordance with claim 11, wherein:
said processor further executes the operation of performing predetermined image processing on said partial run-length data representing said partial image.

13. A method in accordance with claim 1, wherein said step (e) comprises the steps of:
reading out run-length data representing scanning lines in said second range of subscanning coordinate from said first memory; and
extracting partial run-length data which represents an image area in said first range of main scanning coordinate.

14. The apparatus in accordance with claim 5, wherein said extraction means comprises:
means for reading out run-length data representing scanning lines in said second range of subscanning coordinate from said first memory; and
means for extracting partial run-length data which represents an image area in said first range of main scanning coordinate.

15. The apparatus in accordance with claim 9, wherein said processor further executes the operation of:
reading out run-length data representing scanning lines in said second range of subscanning coordinate from said RAM; and
extracting partial run-length data which represents an image area in said first range of main scanning coordinate.

* * * * *